(12) United States Patent
Raves et al.

(10) Patent No.: US 6,904,496 B2
(45) Date of Patent: Jun. 7, 2005

(54) COMPUTER SYSTEM WITH IMPROVED WRITE CACHE AND METHOD THEREFOR

(75) Inventors: David M. Raves, Lago Vista, TX (US); Stanley L. Merkin, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 385 days.

(21) Appl. No.: 10/105,760

(22) Filed: Mar. 25, 2002

(65) Prior Publication Data

US 2003/0182500 A1 Sep. 25, 2003

(51) Int. Cl.$^7$ ............................................. G06F 12/00
(52) U.S. Cl. ...................... 711/113; 711/112; 711/155; 711/163; 711/165
(58) Field of Search ................................ 711/113, 112, 711/155, 163, 165

(56) References Cited

U.S. PATENT DOCUMENTS

| | | | | |
|---|---|---|---|---|
| 5,163,142 A | | 11/1992 | Mageau | 711/142 |
| 5,268,960 A | | 12/1993 | Hung et al. | 713/200 |
| 5,991,197 A | * | 11/1999 | Ogura et al. | 365/185.11 |
| 6,378,038 B1 | * | 4/2002 | Richardson et al. | 711/114 |
| 6,523,103 B2 | * | 2/2003 | Page | 711/173 |
| 2002/0103965 A1 | | 8/2002 | Dawkins et al. | 711/113 |
| 2002/0103975 A1 | | 8/2002 | Dawkins et al. | 711/133 |
| 2003/0070035 A1 | * | 4/2003 | Wang | 711/103 |

FOREIGN PATENT DOCUMENTS

CN 1283821 2/2000

OTHER PUBLICATIONS

U.S. Appl. No. 09/770,146, "System and Method for Time Weighted Access Frequency Based Caching Form Memory Controllers," Dawkins, et al., filed Jan. 26, 2001.
U.S. Appl. No. 09/771,248, "System and Method for Time Window Access Frequency Based Caching Form Memory Controllers," Dawkins, et al., filed Jan. 26, 2001.

* cited by examiner

*Primary Examiner*—Kimberly McLean-Mayo
(74) *Attorney, Agent, or Firm*—Baker Botts L.L.P.

(57) ABSTRACT

Method of operating a computer system with a central processing unit and a hard disk system coupled with the central processor, the method comprising the steps of:

- partitioning the hard disk into at least a bootable partition and a second partition;
- determining a write protection for the bootable partition;
- using the second partition as a write cache thereby maintaining the bootable partition;
- if a write protection is not set, then flushing the write cache to the bootable partition during a shutdown procedure.

13 Claims, 3 Drawing Sheets

COMPUTER SYSTEM WITH IMPROVED WRITE CACHE AND METHOD THEREFOR

FIELD OF THE INVENTION

The present invention relates to a computer system with an improved write protection mechanism, in particular an improved write cache.

BACKGROUND OF THE INVENTION

Today's computer systems, in particular personal computer systems, comprise sophisticated operating systems which are usually loaded from a hard disk during a boot procedure. These so-called boot images are usually stored on a system hard disk or in some applications on CDROM drives. Such operating systems do not load every routine into the memory of the computer system as some parts of the operating system are only used infrequently or for reasons to save system memory for applications, etc. Modern operating systems often update themselves upon interaction with a user or based on internal procedures. Such an update is usually stored on the respective system hard disk to keep the changes permanently stored and available on the next session. These updates can be critical or even unwanted in some applications. Furthermore, there are applications for personal computers, which require the ability to write protect a storage device which contains a bootable part for the operating system under normal operating conditions. For many different reasons a write protection is therefore necessary.

For example, if a bootable part is provided by a CDROM drive, every attempt to write to the CDROM will naturally fail and generate a respective error message. Thus, for example, in the WINDOWS NT® Embedded 4.0 product from the MICROSOFT® corporation, a write filter device driver is provided primarily for the purpose of supporting boot images on CDROM devices. While such a filter can be used with any kind of storage device it is often too limiting for many applications. An application which requires a high level of security and therefore a write protection, for example, is a Thin client. In particular during normal operation, such a system is desired to be write protected. However, such a system also needs some mechanism to allow an administrator to configure the operating system and thus permanently modify the boot image.

Another limitation of the Microsoft® write filter includes a dependence upon available memory resources. Since these kind of operating systems require the ability to dynamically modify and expand many operating systems and application specific files, it requires the filter in effect to make the storage device appear to be read/write media with adequate free space available to the file system. Once all available memory is consumed, the operating system will fail since it can no longer store newly modified data.

SUMMARY OF THE INVENTION

Therefore, a need for an improved write protection system exists which overcomes the above mentioned problems. In one embodiment of the present invention a method of operating a computer system with a central processing unit and a hard disk system coupled with the central processor, comprises the steps of:

partitioning the hard disk into at least a bootable partition and a second partition;

determining a write protection for the bootable partition;

using the second partition as a write cache thereby maintaining the bootable partition;

if a write protection is not set, then flushing the write cache to the bootable partition during a shutdown procedure.

Another exemplary embodiment is a computer system comprising a central processing unit, a hard disk system with at least one hard disk partitioned to provide a bootable partition and a second partition, a write protection means for the bootable partition, and a hard disk driver for accessing the hard disk wherein the second partition operates as a write cache for the bootable partition and a flush operation is only performed if the first partition is not write protected.

Yet another embodiment is a method for providing a hard disk driver for a partitioned hard disk comprising the steps of:

using a first partition as a bootable partition comprising operating system files;

using a second partition as write cache for the first partition wherein the second partition cannot be accessed by the operating system.

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

Figure 1:
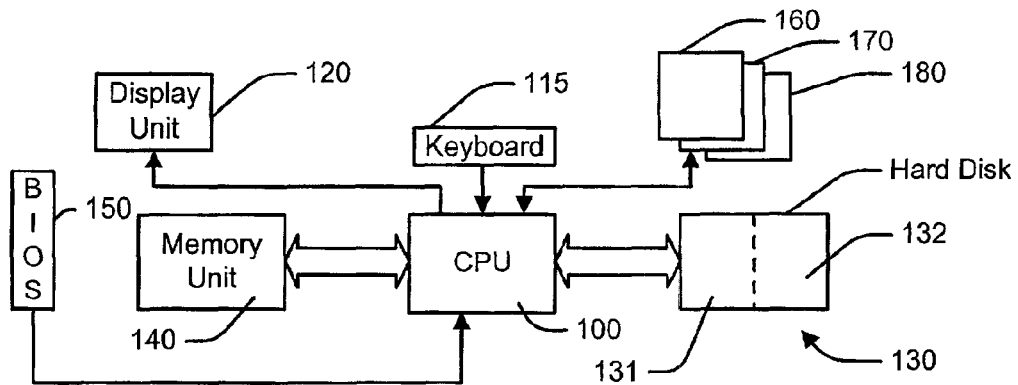
FIG. 1 is a block diagram of an exemplary embodiment of the present invention.

Turning to the drawings, exemplary embodiments of the present application will now be described. FIG. 1 shows a block diagram of a computer system 100. The system 100 comprises a central processing unit 110 (CPU) as its central element. Connected to the CPU 110 are a keyboard 115, a display 120, one or more hard disks 130, a memory system 140, and a plurality of peripheral units 160, 170, . . . 180. According to the present invention the hard disk is partitioned into at least two partitions 131 and 132. As part of the memory system, a basic input/output system (BIOS) is stored in a non-volatile memory such as a boot read only memory (ROM).

Figure 2:
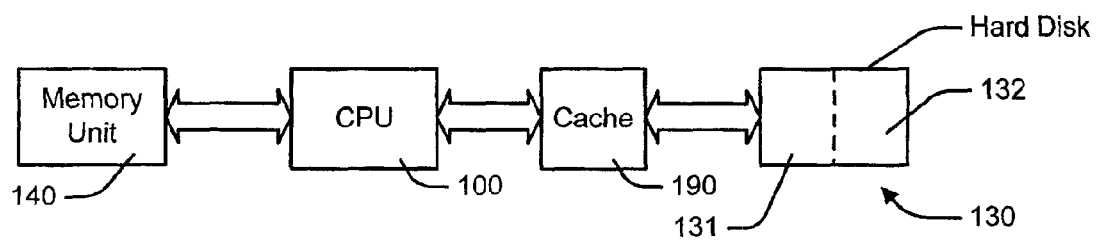
FIG. 2 is a block diagram of another exemplary embodiment of the present invention.

FIG. 2 shows a similar system, whereby only the memory unit and the hard disk are shown. Similar elements are designated by similar numerals. In addition to the system shown in FIG. 1, a hardware disk cache system 190 is provided and coupled between the CPU 100 and the hard disk 130.

During normal operation of the computer system 100, the hard disk operates with both partitions read and writeable. The operating system is stored in either one of the partitions 131 or 132 as a boot image file and loaded under the control of the BIOS 150 during a boot procedure. This boot image is wholly or partly loaded into the memory unit 140 depending on the operating system. Memory unit 140 can comprises an integrated cache system (not shown) and the operating system may update its files or data bases during operation as defined and needed by the respective procedures of the operating system.

Figure 3:
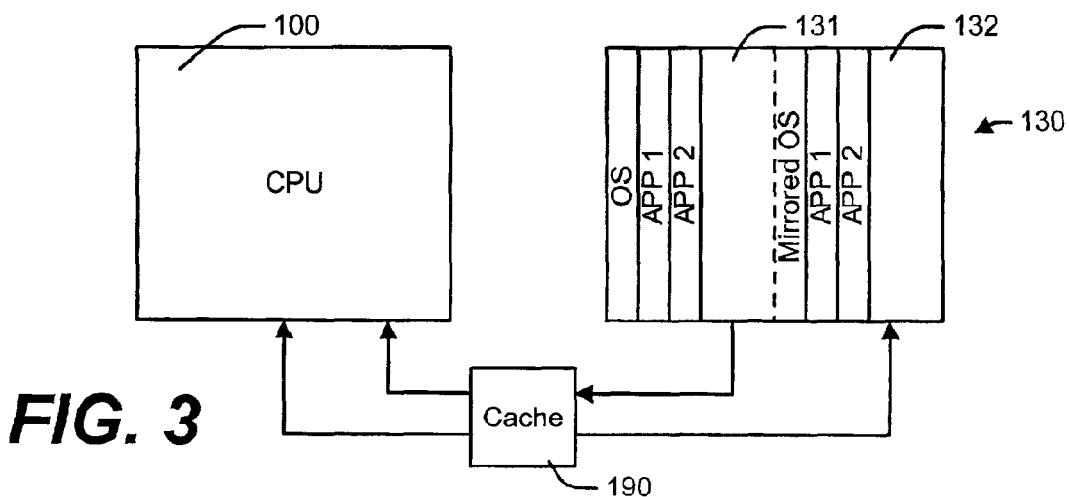
FIG. 3 is a block diagram showing the use of the hard disk according to the present invention in more detail.

During a protected mode, the system operates differently. In this mode the partition containing the operating system is write protected. The second partition is usually not accessed by the operating system and handled through a specific driver which can be part of the BIOS. The specific BIOS driver operates differently on the different partitions 131 and 132 of the hard disk 130. FIG. 3 shows an example of how the partitions 131 and 132 are used in an arrangement using a hard disk cache 190. Again, similar elements are designated by similar numerals. It is assumed that the first partition 131 is bootable and comprises the boot image of the operating system OS as well as a first and second application App 1 and App 2. The specific BIOS driver according to the present invention shows only partition 131 to the user. However, in this mode this partition is completely write protected, for example, because both applications App 1 and App 2 need to run from a write protected hard disk. The driver according to the invention uses the second partition in the background for all read and write operations once the first reading has be completed from the first partition. Thus, a mirrored image of the first partition is created. According to the present invention the operating system has not to be changed as it will not notice that the write and some of the read accesses have been redirected. The original image stored on the partition 131 will therefore be "untouched". However, the shutdown process will be different in this second protected mode. During shutdown, a menu will be presented showing the different files stored on the mirrored partition 132. The user now has the option to selectively or completely accept all changes made during his session. Only if he accepts these changes the selected files will be actually copied to the first partition and thus the system will be completely updated. This specific function may only be accessed by an administrator. Thus, a "normal" user with limited access rights cannot alter the content of the first partition 131 whereas an administrator with all access rights can alter and configure the system as needed.

Figure 4:
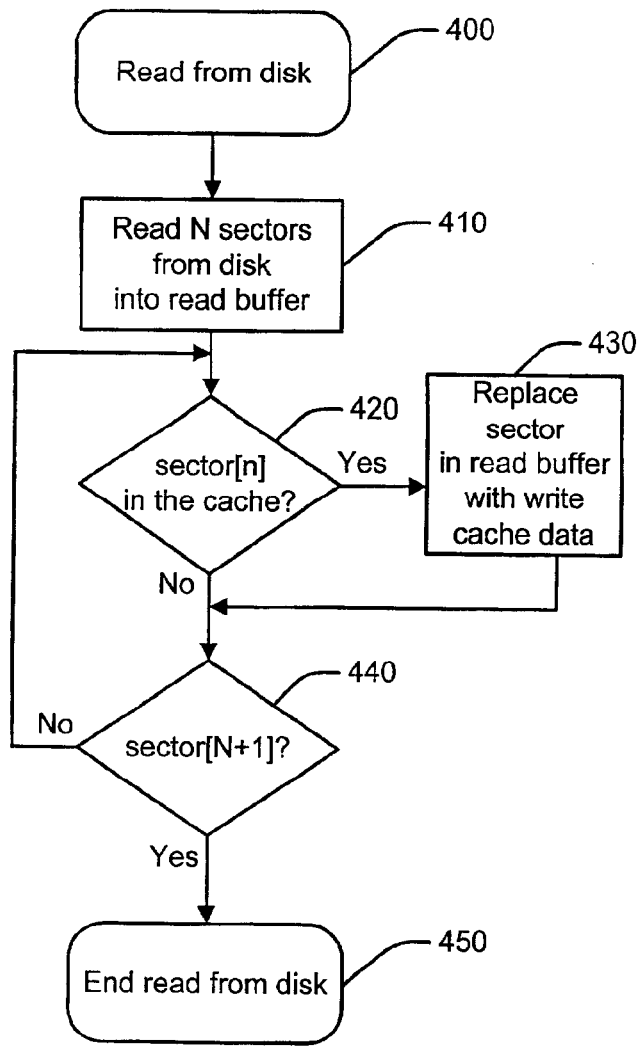
FIG. 4 shows a first flow chart diagram according to the present invention.

FIG. 4 shows a flow chart of a read procedure according to an embodiment using the second partition which is not visible to the operating system as a write cache as shown in FIG. 2. The routine starts at step 400 generating an offset pointing to the addressed sector. In step 410 a read for N sectors from the disk is conducted, wherein N sectors are read from the disk starting with the offset. In the following replacement loop, a denominator is set to 0, for example, n=0. Then, it is asked whether a current sector n is already in the write cache 190. To this end, n again is used as an index which is added to a respective offset. If the comparison results in a TRUE, then in step 430 this the respective sector in the read buffer is replaced by the respective sector from the write cache 190. If not, then in step 440 n is incremented and it is asked whether n=N+1. If not, then the routine returns to step 420 and continues to run through the loop until n=N+1. The routine ends in step 450 when n reaches N+1.

Figure 5:
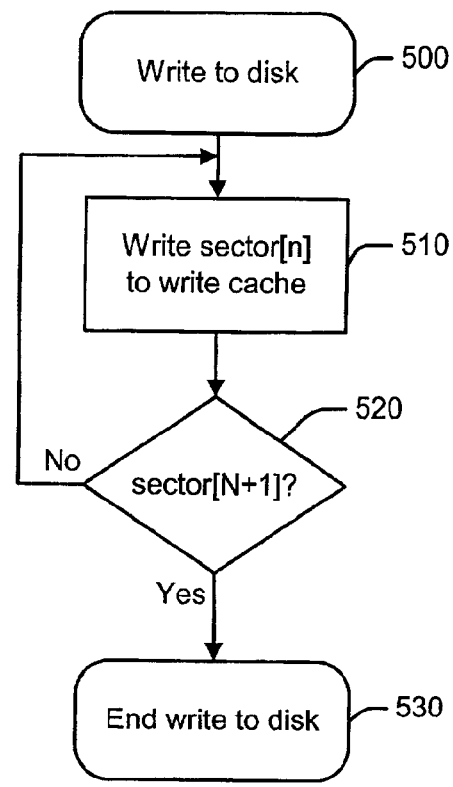
FIG. 5 shows a second flow chart according to the present invention.

FIG. 5 shows the respective write routine. The routine starts in step 500 with n set to 0. Again a respective offset is used to point to the first sector and n is used as an index added to this offset. In step 510 the content of the sector n is written to the write cache. In step 520 n is incremented and it is checked whether n=N+1. If not the loop continues at step 510, if yes, the routine ends in step 530.

The system described above can be implemented with or without an additional solid state write cache. Such an additional write cache can be implemented as a write-through cache which in case of a write transfers the sector to both, the solid state cache and the second partition forming the write cache proper.

Figure 6:
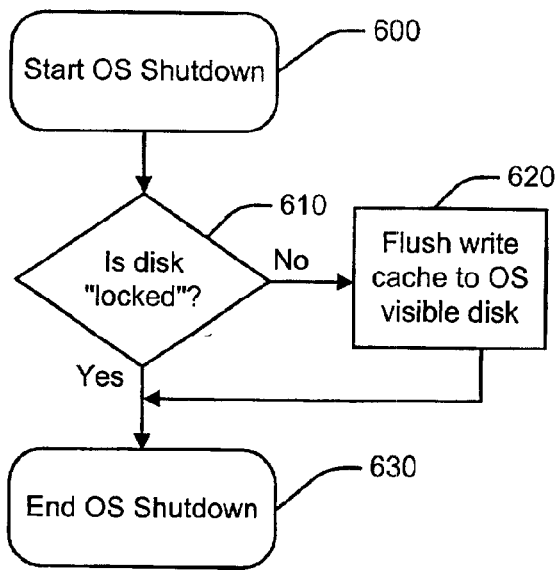
FIG. 6 shows a second flow chart according to the present invention.

FIG. 6 shows a shutdown procedure of the computer system. In step 600 a shutdown procedure is started. In step 610 the procedure checks whether the first partition is "locked" or in other words "write protected." If not, the routine flushes the write cache (second partition) to the first partition. Otherwise, the second partition can be marked as not flushed or deleted.

Figure 7:
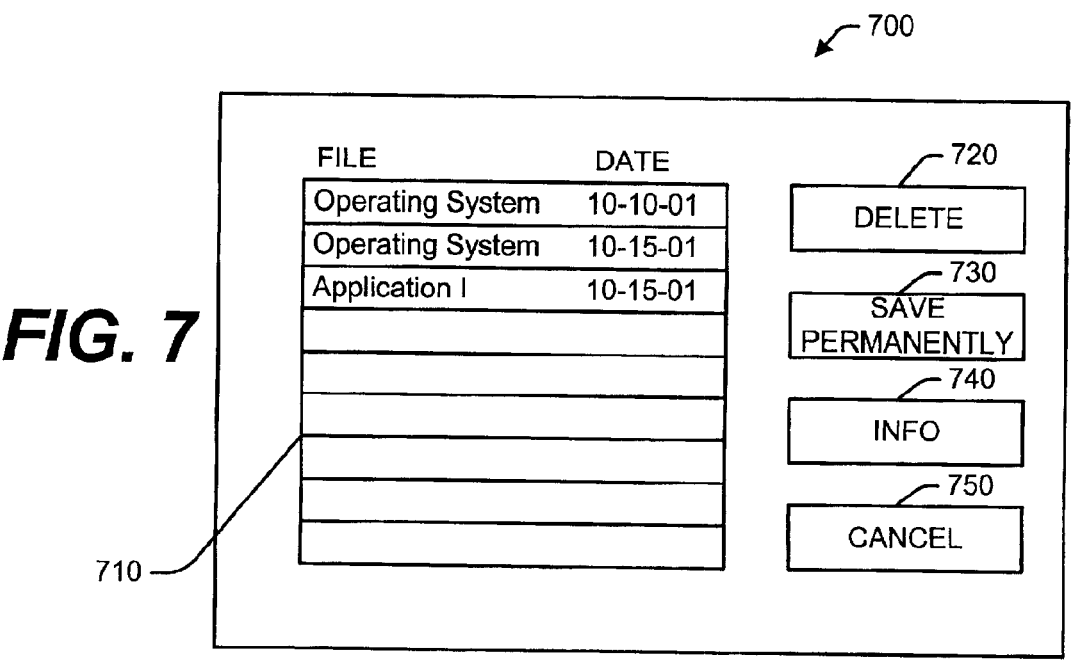
FIG. 7 shows a dialog box for use in a system according to the present invention.

FIG. 7 shows additional options for handling the second partition or write cache. During the shutdown process as shown in FIG. 6, a dialog box as shown in FIG. 7 will pop up showing the status of the system on the second partition. This dialog box can be generated preferably only for administrators or users with respective access rights. In another embodiment this dialog box will always be generated with certain functions only enabled if the respective users has the necessary access rights. The dialog box 700 comprises a first data field 710 containing a list of operating system images which have been recently generated but not flushed to the first partition. This list may contain a descriptive term to indicate the file and, for example, the date the image file has been created. If an application has been treated in a similar way, a respective entry for those files can also be indicated as shown in FIG. 7. A user can select the different image files of the operating system or the application and, for example, delete the file by activating a "delete"-button 720, save the file on the first partition by activating a "save permanently"-button 730, receive more information about the file by activating a "info"-button 740, or leave the dialog box with no changes made to the system by activating a "cancel"-button 750. Thus, complete control even over older changes to the operating system or an application can be obtained.

As described above, the invention can be used with operating systems or applications run from a write protected partition of a system hard disk. The system hard disk can comprise of course a plurality of partitions whereby only one partition is used as a write cache partition which is not visible to the user and the operating system proper. The size of such a write cache partition can be the same size as the partition containing the bootable operating system or can be adapted to have enough space for all the system files of a operating system.

The embodiments of the present invention can be provided in the form of a device driver, and is intended primarily to support read/write media such as rotating disks and solid-state storage devices. The write protection for the first or bootable partition can be implemented as a hardware write protection or a software write protection. Furthermore, the step of reading from the first partition and the replacing step if respective data/sectors had been written to the write cache/second partition can be replaced by a mechanism that checks whether the write cache/second partition contains the actual valid data as used in solid state cache memory systems. Thus, the system will not experience any time delays while accessing data from the system.

While it uses memory resources in order to provide performance enhancements, it does not rely on it as the only read/write resource. In essence, disk sectors will be used for temporary storage of modified data. These sectors must be located in disk space, which is not claimed by OS visible partitions (i.e. free space). With the availability of large capacity disk drives (>=10 GB), dedicating a fraction of the total disk space for this purpose is not unrealistic in particular in Thin Client applications. Whereas a memory-only driver would be restricted to a fraction of the total available dynamically allocated system memory (typically 64 MB to 128 MB), the exemplary embodiments of this invention would allow for a static configuration, which conceivably could allow for write protecting the entire OS visible disk space. For example, a 10 GB disk drive could be partitioned with a 5 GB NTFS partition and 5 GB of free space, allowing for all OS visible sectors to be write-protected. In essence, the embodiments of this invention will "cache" all OS writes to the disk in free space. When the OS attempts to read data, which had been previously modified, it will retrieve the actual data from free space and return it transparently to the OS. The OS will continue to function as if all data had been committed to its visible image.

While the cost of solid-state memory has dropped significantly, the same can also be said for rotating disk storage devices. It would be much more expensive to add additional memory to a system in order to support "write caching" as opposed to dedicating a portion of a disk drive to free space. For Thin Clients, this is by far the preferred trade-off since majority of customer images will fit in a footprint that is less than 128 MB. Adding additional SDRAM to these systems in order to fully write-protect this image is cost prohibitive in this market segment.

Finally, when the user elects to shutdown the system, a decision can be made as described above to either commit the cached write data to disk (and thereby update its image), or to treat the disk as "locked" and disregard all write data and exit. In the latter case, the initial (pre-boot) disk image will be preserved.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. Method of operating a computer system with a central processing unit and a hard disk system coupled with the central processor, the method comprising the steps of:
   partitioning the hard disk into at least a bootable partition comprising a boot image of an operating system and a second partition;
   determining a write protection for the bootable partition;
   creating a mirrored image of the boot image on the second partition;
   using the second partition as a write cache thereby maintaining the bootable partition;
   if a write protection is not set, then flushing the write cache to the bootable partition during a shutdown procedure, wherein a user can select whether the write cache is flushed to the bootable partition or not.

2. Method according to claim 1, wherein write operations modifying a operating system are cached on the second partition.

3. Method according to claim 1, wherein write operations modifying an application are cached on the second partition.

4. Method according to claim 1, wherein the steps are implemented in a driver.

5. Method according to claim 4, wherein the driver is part of the basic input/output system.

6. Method according to claim 1, wherein the step of using the second partition as a write cache comprises the steps of:
   performing a read operation from the bootable partition;
   replacing data from the read operation if respective data has been written to the second partition.

7. Computer system comprising:
   a central processing unit;
   a hard disk system comprising at least one hard disk partitioned to provide a bootable partition comprising a boot image of an operating system and a second partition;
   a write protection means for the bootable partition;
   a hard disk driver for accessing the hard disk wherein the second partition comprises a mirrored image of the boot image and operates as a write cache for the bootable partition and;
   means for performing a flush operation if the first partition is not write protected, wherein a user can select whether the write cache is flushed to the bootable partition or not.

8. Computer system according to claim 7, further comprising a solid state write cache.

9. Computer system according to claim 8, further comprising a solid state write-through cache.

10. Method for providing a hard disk driver for a partitioned hard disk comprising the steps of:
    using a first partition as a bootable partition comprising a boot image of an operating system;
    using a second partition as write cache for the first partition wherein the second partition comprises a mirrored image of the boot image and cannot be accessed by the operating system,
    if a write protection is not set, then flushing the write cache to the bootable partition during a shutdown procedure, wherein a user can select whether the write cache is flushed to the bootable partition or not.

11. Method as in claim 10, further comprising the steps of:
    performing a read access from the first partition; and
    performing a write access to the second partition.

12. Method according to claim 10, wherein a read access is performed by reading a plurality of sectors from the first partition and replacing any sector that has been store on the second partition by a respective sector from the second partition.

13. Method according to claim 11, wherein the first partition is write protected.

* * * * *